United States Patent Office 3,629,203
Patented Dec. 21, 1971

3,629,203
PROCESS FOR THE MANUFACTURE OF POLY-β-ALANINE COMPRISING REACTING ACRYLONITRILE WITH FORMIC ACID
Theodor Volker and Hanspeter Hugener, Fribourg, Switzerland, assignors to Lonza Ltd., Basel, Switzerland
No Drawing. Filed Feb. 18, 1970, Ser. No. 12,463
Claims priority, application Switzerland, Feb. 19, 1969, 2,491/69
Int. Cl. C08g 20/06
U.S. Cl. 260—78 A      11 Claims

ABSTRACT OF THE DISCLOSURE

Poly-β-alanine is produced by reacting acrylonitrile with formic acid at a temperature of 150°–300° C. (preferably 200°–240° C.) under pressure.

BACKGROUND OF THE INVENTION

Field of the invention

The present invention relates to a process for the manufacture of poly-β-alanine from acrylonitrile.

Prior art

It is known how to manufacture poly-β-alanine from acrylic compounds such as acrylamide, acrylic acid ester and salts thereof, by reacting same with an aqueous solution of ammonia or by polymerization of acrylamide in the presence of strongly alkaline catalysts.

It is also known how to manufacture this product, starting with acrylonitrile and treating same with liquid ammonia or water in the presence of a slightly basic catalyst such as ZnO.

A further process is known for the manufacture of poly-β-amino carboxylic acids by reacting an α-β-ethylenically unsaturated nitrile, e.g. acrylonitrile, with water, in the presence of an inert atmosphere and if necessary using specific catalysts.

The disadvantage of all these known processes is that the yield of poly-β-alanine of high molecular weight is very disappointing in terms of the length of time required for the reacting. Moreover, if acrylamide is to be used, as the starting material, it must first be made separately from acrylonitrile in a prior process.

Netherlands specification 6,712,120 discloses a process for producing carboxylic acid amides and carboxylic acid polyamides by the action of nitrile with formic acid. In this known process, however, double decomposition of unsaturated nitriles with formic acid gives unsaturated amides. For the manufacture of polyamides, hydroxycarboxylic acid nitriles have to be introduced as starting materials for the reaction. The possibility of direct production of poly-β-alanine in high yield by the action of formic acid on acrylonitrile cannot be derived from this disclosure, since such action would lead one to expect the production of quite a different reaction product, namely acrylamide.

DETAILED DESCRIPTION OF THE INVENTION

The object of the present invention is to avoid the disadvantages of the known processes, and to produce poly-β-alanine directly and in large quantities, starting with acrylonitrile.

According to the invention, these objects are attained by reacting acrylonitrile with formic acid at temperatures in the range of 150 to 300° C. under pressure.

The reaction is preferably effected under a self-adjusting pressure during the course of the reaction. The reaction thus takes place in a liquid phase in a closed vessel, for example, a pressure tube, a digester or an autoclave. Thus, the pressure is autogenous, being dependent on the reaction temperature.

The reaction preferably takes place in the temperature range of 200 to 240° C.

Preferably, the reaction is effected in the presence of polymerization inhibitors, such as hydroquinone monoether, pyrocatechol, or phenothiazine, which prevent polymerization of acrylonitrile.

The reaction is usually accomplished without the presence of water, and it can be effected in the presence or absence of inert diluents.

A diluent, if used to facilitate recovery of reaction product from starting material, should preferably be a material which is a solvent for the starting compounds but which does not dissolve the poly-β-alanine. Such solvents are, for example, benzene, toluene, xylene, decahydronaphthalene. Moreover, the use of a diluent produces poly-β-alanines with higher molecular weights than those produced without their use.

In certain circumstances it may be expedient to effect the reaction in the presence of proton charging agents, such as sulfuric acid.

The acrylonitrile is expediently employed with formic acid in equimolar proportions. It is, however, feasible to use a slight excess of formic acid, say up to 1.5 mols per mol of acrylonitrile. In this latter case, the reaction velocity is speeded up. The length of the reaction depends on the reaction temperature.

The optimum products and yields are obtained with reaction temperatures from 200 to 220° C. with the reaction taking from 60 to 180 minutes.

If at the start of the reaction, the reaction vessel is cold, that is, if the materials for reaction are placed into the reactor at ambient temperature, the heating-up period of the reaction must be taken into account in determining the optimum reaction time.

The poly-β-alanine produced by the process of the invention can be converted into β-alanine by acid hydrolysis according to known methods. β-Alanine is useful in the synthesis of pantothenic acid, a known vitamin.

There will now be given several examples of the invention:

Example 1.—26.5 g. (0.5 mol) of acrylonitrile, 23.0 g. (0.5 mol) of formic acid, 0.5 g. of sulfuric acid and 0.3 g. of hydroquinone were put into a V₄A (stainless) steel autoclave of 300 ml. capacity and stirred while heating up for 3 hours to 290° C. Pressure in the autoclave rose to 90 gauge. After cooling and releasing the pressure of the autoclave, the solidified product was treated with hot water, that is, sludged in hot water and poured out of the autoclave. After water extraction in a rotary evaporator, the poly-β-alanine yield came to 93 mol percent. The poly-β-alanine began fusing at 290° C.

Example 2.—26.5 g. of acrylonitrile, 23.0 g. of formic acid (50 g. of benzene, 0.5 g. of sulfuric acid and 0.5 g. of hydroquinone were put into the reaction vessel described in Example 1 and heated for 45 minutes to 220° C. This reaction temperature was maintained for 2 hours, and the pressure amounted to 80 gauge. Subsequently the vessel was cooled and the pressure released. The reaction product which was sludged in benzene, was poured out of the vessel. The solid poly-β-alanine was separated from the benzene, washed and dried. The poly-β-alanine yield was 99% of the theoretical calculation. The product fused at more than 300° C.

Example 3.—26.5 g. of acrylonitrile, 23.0 g. of formic acid and 0.3 g. of hydroquinone were poured into the autoclave described in Example 1 and stirred for 75 minutes while heating up to 200 to 220° C. This temperature was maintained for a further 120 minutes. Pressure rose to 65 gauge. After conclusion of the reaction and cooling off, the solidified reaction product was sludged with hot water and removed from the reaction tank. The water was extracted as in Example 1. The resultant yield in poly-β-alanine was 99% of the theoretical amount.

The poly-β-alanine was subsequently hydrolyzed with sulfuric acid by a known method and β-alanine was liberated by neutralization with barium. The gross yield in insolated β-alanine amounted to 95%. Non-recurrent recrystalization gave an 82% yield in pure β-alanine based on the original acrylonitrile input.

What is claimed is:

1. A process for the manufacture of poly-β-alanine from acrylonitrile, said process comprising reacting acrylonitrile with formic acid at a temperature of 150 to 300° C. under presesure.

2. A process according to claim 1, wherein the reaction is effected at a temperature in the range of 200 to 240° C.

3. A process according to claim 1, wherein the reaction is effected in the presence of a polymerization inhibitor.

4. A process according to claim 3, wherein the polymerization inhibitor is hydroquinone monoether, pyrocatechol or phenothiazine.

5. A process according to claim 1, wherein the reaction is effected in the presence of an inert solvent.

6. A process according to claim 5, wherein the inert solvent is capable of dissolving the starting materials but not the poly-β-alanine.

7. A process according to claim 6, wherein the inert solvent is benzene, toluene, xylene or decahydronaphthalene.

8. A process according to claim 1, wherein the reaction is effected in the presence of a proton charging agent.

9. A process according to claim 8, wherein the proton charging agent is sulfuric acid.

10. A process according to claim 1, wherein the acrylonitrile and formic acid are reacted in a mol ratio of from 1:1 to 1:1.5.

11. A process according to claim 1, wherein reacting is effected for 60 to 180 minutes.

References Cited

UNITED STATES PATENTS

| | | | |
|---|---|---|---|
| 2,672,480 | 3/1954 | Matlack | 260—534 |
| 3,499,874 | 3/1970 | Takahashi et al. | 260—78 |
| 3,499,879 | 3/1970 | Kobayashi et al. | 260—74 X |

HOWARD E. SCHAIN, Primary Examiner

U.S. Cl. X.R.

260—88.7 R, 112.5, 534 A, 534 C